Patented June 28, 1949

2,474,426

UNITED STATES PATENT OFFICE 2,474,426

CYANINE DYESTUFFS AND DYESTUFF INTERMEDIATES

John David Kendall, Harold Gordon Suggate, and Henry Walter Wood, Ilford, England, assignors to Ilford Limited, Ilford, Essex, England, a company of Great Britain No Drawing. Application August 20, 1942, Serial No. 455,442. In Great Britain December 10, 1941

6 Claims. (Cl. 260—240)

This invention relates to the production of new organic compounds which are valuable intermediates in the production of dyestuffs, particularly photographic sensitising dyestuffs, and to the production of dyestuffs therefrom.

According to this invention, new organic compounds are produced by condensing an alkyl, aralkyl or alicyclic mono-alcohol containing a substituent amino group in the β-position to the alcohol group with an acid of the general formula I

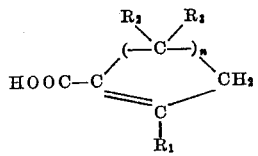

where $R_1$, $R_2$ and $R_3$ are the same or different and are hydrogen atoms or hydrocarbon groups, e. g. alkyl, aryl or aralkyl groups and $n$ is a positive integer greater than 1, or with an anhydride or acid halide of such acid, and thereafter treating the product with phosphorus pentasulphide, phosphorus penta selenide or phosphorus pentoxide.

It is believed that the course of the reaction is as follows:

Stage 1

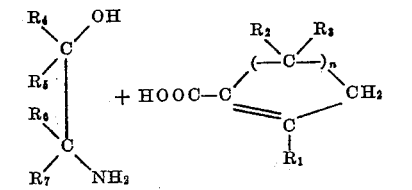

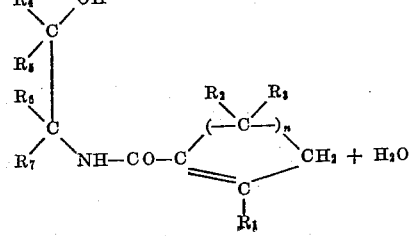

Stage 2

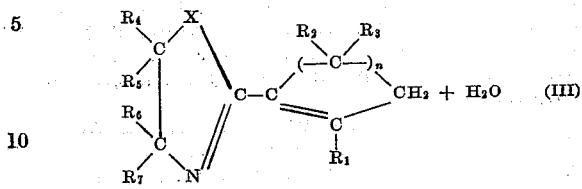

(in the foregoing formulae $R_4$, $R_5$, $R_6$ and $R_7$ may be hydrogen atoms or hydrocarbon radicles or may form part of a saturated carbocyclic ring system, and X is sulphur, selenium or oxygen).

The amino alcohol employed may be, for example, β-amino ethyl alcohol, β-amino propyl alcohol or a higher member of this series, β-amino isopropyl alcohol, β-amino-phenyl-ethyl alcohol or 1:2-amino cyclohexanol.

The compounds of general Formula I may be $\Delta^1$-cyclopentene carboxylic acid, $\Delta^1$-cyclohexene carboxylic acid or a higher homologous acid of this series, or as indicated above, the corresponding acid anhydrides or acid halides, e. g. acid chlorides, may be employed.

The groups $R_1$, $R_2$, $R_3$, $R_4$, $R_5$, $R_6$ and $R_7$ may be hydrogen atoms or alkyl, aryl or aralkyl groups e. g. methyl, ethyl, propyl and higher alkyl groups, benzyl and naphthylmethyl groups, and phenyl, naphthyl and homologous aryl groups. Moreover, such groups may themselves be substituted.

According to a further feature of this invention sensitising dyestuffs for photographic silver halide emulsions are prepared by condensing an alkyl or aralkyl quaternary salt of a compound of general Formula III with an alkyl or aralkyl quaternary salt of a heterocyclic nitrogen compound containing in the α or γ position to a heterocyclic nitrogen atom, a thioether or selenoether grouping (including an aryl-, alkyl- or aralkyl-thioether group or a corresponding selenoether group) or a $-(CH=CH)_xNH_2$ group where $x$ is 1, 2 or 3 (including N-acyl, N-aryl and N-acylaryl substituted groups of this type).

The grouping $-(CH=CH)_xNH_2$ is hereinafter referred to as the amino-vinyl type of group.

The condensation is dependent on the reactivity of the methylene group shown at the right hand end for Formula III and the products conform to the general Formula IV:

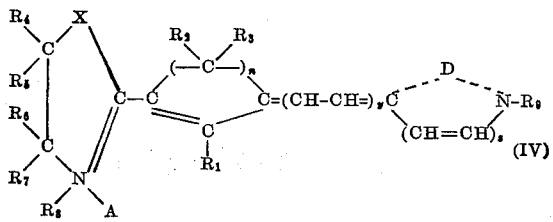

where X, R₁, R₂, R₃, R₄, R₅, R₆, R₇ and $n$ have the meanings assigned to them above, R₈ and R₉ are alkyl or aralkyl groups (e. g. any of the specific alkyl or aralkyl groups mentioned above) $y$ is nought or a small positive integer, e. g. 1 or 2, $z$ is nought or 1, A is an acid residue and D is the residue of a heterocyclic nucleus.

Examples of heterocyclic nitrogen nuclei of which D may be a residue are those heterocyclic nitrogen nuclei commonly employed in cyanine dyes, e. g. the nuclei of substituted and unsubstituted thiazoles, thiazolines, oxazoles, oxazolines, selenazoles, selenazolines, piperidine, quinoline, indolenine, diazines (e. g. pyrimidine), thio-diazoles, and quinazoline and the corresponding substituted or unsubstituted polycyclic compounds such as benzthiazoles, naphthathiazoles, anthrathiazoles and the corresponding polynuclear selenazoles and oxazoles and also the diazines described in British specification No. 425,609.

As already indicated, the process of this invention consists in a reaction between two quaternary salts. The salt groups may be the same or different and may be, for example, chloride, bromide, iodide, sulphate or perchlorate groups. Preferably, however, the reacting quaternary salts are alkyl or aralkyl-p-toluene sulphonates, e. g. ethyl or methyl-p-toluene sulphonate.

In carrying out the process of the invention, it is not necessary to isolate the quaternary salts of the two reactants. Thus, by condensing a compound of general Formula III with a heterocyclic nitrogen base containing the said reactive thioether, seleno-ether or aminovinyl group, together with sufficient alkyl or aralkyl salt to convert both reactants to quaternary salts, the reaction may be effected in one stage. A particularly convenient process is to employ an alkyl or aralkyl-p-toluene sulphonate and to effect the reaction by fusing together the compound of Formula III, the heterocyclic nitrogen base containing the specified reactive group and a sufficiency of alkyl or aralkyl-p-toluene sulphonate to convert both the reactants to quaternary salts.

Preferably, the condensation process of this invention is completed in the presence of an acid-binding agent, e. g. pyridine, piperidine, triethylamine, sodium acetate or sodium carbonate.

The following examples illustrate the invention but are not to be regarded as limiting it in any way:

Example I 2-(Δ¹)-cyclopentenyl thiazoline 15 gms. of β-amino ethyl alcohol and 25 gms. of Δ¹-cyclopentene-carboxylic acid were mixed together and heated at 160–200° C. for about two hours. The mixture was then distilled at 20 mm. pressure and the fraction distilling at 206–210° C. was collected. This was a yellow oil which crystallised on standing and was β-N-(Δ¹-cyclopentenyl) amino ethyl alcohol. 22.5 gms. of this product, warmed to make it fluid, was added, drop by drop to 10 gms. of phosphorus pentasulphide contained in a Claisen flask under slightly reduced pressure. Reaction set in and a mixture of yellow oil and water distilled over at 20 mm. pressure. This was dried over potassium hydroxide and redistilled at 20 mm. pressure, yielding 2-(Δ¹)-cyclopentenyl-thiazoline as a yellow oil boiling at 148–155° C./20 mm.

Example II 2-(Δ¹)-cyclohexenyl thiazoline 97.5 gms. of Δ¹-cyclohexene carboxylic acid were mixed with 48 gms. of β-amino ethyl alcohol and the mixture heated at 180–200° C. for 2½ hours. The residue was then distilled and yielded β-N-(Δ¹-cyclohexenyl) amino ethyl alcohol as a viscous colourless liquid boiling at 225–235° C. at 25 mm. pressure. A mixture of 57 gms. of this product and 28 gms. of phosphorus penta sulphide were warmed gently in a claisen flask under reduced pressure. A vigorous reaction occurred. The distillate obtained was dissolved in ethyl ether, washed with water and dried over potassium carbonate. The ether was then removed by evaporation and the residue was distilled under reduced pressure and then re-distilled under reduced pressure. The desired product was thus obtained as a colourless oil boiling at 135–6° C. at 12 mm. pressure.

Example III

3:2'-dimethyl 6:7'-trimethylene thiazolino thiacarbocyanine iodide 1.6 gms. of 2-(Δ¹)-cyclohexenyl thiazoline, 1.8 gms. of 2-methylthiol benzthiazole and 3.7 gms. of methyl-p-toluene sulphonate were fused together at 160–180° C. for three hours. The fused product was dissolved in 12 ccs. of pyridine, gently refluxed for 30 minutes and then poured into a warm aqueous solution of potassium iodide. An oil precipitated and solidified on standing. It was separated by filtration, washed with hot benzene and recrystallised from methyl alcohol solution. The desired dyestuff was thus obtained as dark green crystals, melting at 167° C.

When incorporated in a gelatino silver iodobromide emulsion this dyestuff imparted a band of sensitivity extending to about 7000 Å. with a maximum at about 6400 Å.

Example IV

3:2'-dimethyl 4':5'-dimethoxy-6:7'-trimethylene-thiazolino-thiacarbocyanine iodide 1.35 gms. of 2-(Δ¹)-cyclohexenyl thiazoline, 2.0 gms. of 2-methylthiol-4:5-dimethoxy-benzthiazole and 3.2 gms. of methyl-p-toluene sulphonate were reacted as in Example III. The dyestuff was obtained as dark blue crystals melting at 224° C. When incorporated in a gelatino silver iodobromide emulsion this dyestuff imparted a band of sensitivity extending to about 7000 Å. with a flat maximum in the region of 6400–6800 Å.

Example V

3:2'-dimethyl-5':6'-benz-6:7'-trimethylene thiazolino thiacarbocyanine iodide 2.0 gms. of 2-(Δ¹)-cyclohexenyl thiazoline, 2.31 gms. of 2-methyl thiol 5:6-naphthathiazole and 3.72 gms. of methyl-p-toluene sulphonate were reacted as in Example III. The dyestuff was obtained as dark blue crystals, melting at 246° C. When incorporated in a gelatino silver iodobromide emulsion, this dyestuff imparted a band of sensitivity extending to about 6900 Å. with a maximum at about 6400 Å.

EXAMPLE VI

*3:2'-dimethyl 6:9'-trimethylene thiazolino thiadicarbocyanine iodide*

1.67 gms. of 2-($\Delta^1$-)-cyclohexenyl thiazoline and 1.86 gms. of methyl-p-toluene sulphonate were fused at 130–140° C. for 3½ hours. The quaternary salt thus formed was dissolved in 25 ccs. of pyridine, 4.35 gms. of 2-acetanilido-vinyl benzthiazole methiodide was added, and the mixture refluxed for 20 minutes. The solution was then poured into a warm aqueous solution of potassium iodide. On cooling, a by-product crystallised out and this was filtered off and rejected. The filtrate was then further diluted whereupon an oil separated. This oil was caused to solidify by treatment with alcohol and acetone and the solid product was recrystallised from methyl alcohol solution. It consisted of dark blue crystals melting at 232° C.

When incorporated in a gelatino silver iodobromide emulsion this dyestuff imparted a band of sensitivity extending to about 7000 Å with a maximum at about 6700 Å.

EXAMPLE VII

*3:2'-dimethyl 6:7'-dimethylene thiazolino thiacarbocyanine bromide*

1.53 gms. of 2-($\Delta^1$)-cyclopentenyl thiazoline, 1.81 gms. of 2-methylthiol benzthiazole, and 3.9 gms. of methyl-p-toluene sulphonate were fused together at 140° C. for 3½ hours. The fused product was then refluxed with 20 ccs. of pyridine for 20 minutes. The solution was then poured into aqueous potassium bromide solution and allowed to cool. The product crystallised out and was separated and recrystallised from methyl alcohol solution. It consisted of dark green crystals.

As indicated in the foregoing examples, the dyestuffs of this invention are valuable sensitisers for silver halide emulsions. Thus they may be incorporated in silver chloride, silver bromide, silver iodobromide or silver chlorobromide emulsions. Many of them impart a very high degree of sensitivity in the red region of the spectrum whilst imparting little or no sensitivity in the green region of the spectrum, which for certain specialised purposes, e. g. for producing colour separation records in colour photography, is an advantage.

What we claim is:

1. A process for the manufacture of dyestuffs which comprises condensing a compound selected from the class consisting of the alkyl and aralkyl quaternary salts of a compound of the general formula:

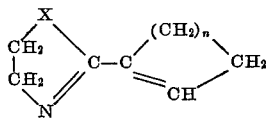

where X is selected from the class consisting of oxygen, sulphur and selenium and $n$ is more than 1 and not greater than 3, with a compound selected from the class consisting of the alkyl and aralkyl salts of a heterocyclic nitrogen compound of the type commonly used in the manufacture of cyanine dyes containing in one of the $\alpha$ and $\gamma$ positions to the quaternary heterocyclic nitrogen atom, a reactive group selected from the class consisting of thioether, selenoether, and aminovinyl groups.

2. A process according to claim 1 wherein at least one of the said quaternary salts is formed in situ during the reaction.

3. A process for the manufacture of dyestuffs which comprises condensing a compound of the general formula:

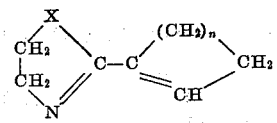

where X is selected from the class consisting of oxygen, sulphur and selenium and $n$ is more than 1 and not greater than 3, with a heterocyclic nitrogen compound of the type commonly used in the manufacture of cyanine dyes containing in one of the $\alpha$ and $\gamma$ positions to the heterocyclic nitrogen atom a reactive group selected from the class consisting of thioether, selenoether, and aminovinyl groups, in the presence of a sufficiency of a compound selected from the class consisting of alkyl and aralkyl salts to convert both the said compounds to quaternary salts.

4. A process for the manufacture of dyestuffs which comprises condensing a compound of the general formula:

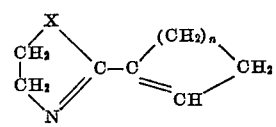

where X is selected from the class consisting of oxygen, sulphur and selenium and $n$ is a positive integer greater than 1, with a heterocyclic nitrogen compound of the type commonly used in the manufacture of cyanine dyes containing in one of the $\alpha$ and $\gamma$ positions to the heterocyclic nitrogen atom a reactive group selected from the class consisting of thioether, selenoether, and aminovinyl groups in the presence of a sufficiency of an alkyl-p-toluene sulfonate to convert both the said compounds to quaternary salts.

5. Dyestuffs of the general formula:

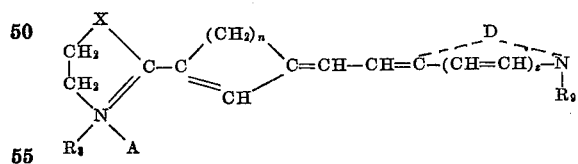

where $R_8$ and $R_9$ are selected from the class consisting of alkyl and aralkyl groups, D is the residue of a heterocyclic nitrogen base of the type used in cyanine dyes, A is an acid residue, X is selected from the class consisting of oxygen, sulphur and selenium and $n$ is an integer greater than 1 and not greater than 3, and $z$ is selected from the class consisting of nought and 1.

6. Dyestuffs of the general formula:

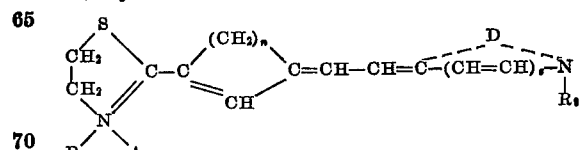

where $R_8$ and $R_9$ are selected from the class consisting of alkyl and aralkyl groups, D is the residue of a heterocyclic nitrogen base of the type used in cyanine dyes, A is an acid residue and $n$ is an integer greater than 1 and not greater than 3, and $z$ is selected from the class consisting of nought and 1.

JOHN DAVID KENDALL.
    HAROLD GORDON SUGGATE.
    HENRY WALTER WOOD.

REFERENCES CITED

The following references are of record in the file of this patent:

UNITED STATES PATENTS

| Number | Name | Date |
|---|---|---|
| 1,861,836 | Brooker | June 7, 1932 |
| 1,950,876 | Brooker | Mar. 13, 1934 |
| 1,957,869 | White | May 8, 1934 |
| 1,969,444 | Brooker | Aug. 7, 1934 |
| 2,027,031 | Engleman | Jan. 7, 1936 |
| 2,138,223 | Wilmanns | Nov. 29, 1938 |
| 2,238,031 | Riester | Aug. 15, 1941 |
| 2,265,909 | Kendal | Dec. 9, 1941 |
| 2,307,916 | Brooker | Jan. 12, 1943 |
| 2,323,503 | Wilson | July 6, 1943 |

FOREIGN PATENTS

| Number | Country | Date |
|---|---|---|
| 511,940 | Great Britain | 1939 |

OTHER REFERENCES

Morton, "Chemistry of the Heterocyclic Compounds," 1946, p. 419. (Based on J. Amer. Chem. Soc., vol. 57, p. 1079, 1935.)